United States Patent [19]
McCartney et al.

[11] Patent Number: 5,671,110
[45] Date of Patent: Sep. 23, 1997

[54] GROUND SKEW PROTECTION METHOD AND APPARATUS

[75] Inventors: Thomas McCartney, Lake Bluff; Laurence H. Fish, Highland Park, both of Ill.

[73] Assignee: Oneac Corporation, Libertyville, Ill.

[21] Appl. No.: 589,980

[22] Filed: Jan. 23, 1996

[51] Int. Cl.$^6$ .................................................. H02H 3/00
[52] U.S. Cl. .......................... 361/42; 361/58; 361/111; 361/119
[58] Field of Search ............... 361/42–50, 111, 361/58, 119

[56] References Cited

U.S. PATENT DOCUMENTS

| | | | |
|---|---|---|---|
| 4,180,841 | 12/1979 | Engel | 361/45 |
| 4,428,018 | 1/1984 | Hahn | 361/42 |
| 4,573,098 | 2/1986 | Williston | 361/42 |
| 4,751,607 | 6/1988 | Smith | 361/119 |
| 4,823,383 | 4/1989 | Cardot et al. | 361/119 |
| 4,845,580 | 7/1989 | Kitchens | 361/91 |
| 4,882,646 | 11/1989 | Genuit | 361/42 |
| 5,174,293 | 12/1992 | Hagiwara | 128/653.1 |
| 5,177,657 | 1/1993 | Baer et al. | 361/45 |
| 5,448,443 | 9/1995 | Muelleman | 361/111 |
| 5,490,030 | 2/1996 | Taylor et al. | 361/45 |

*Primary Examiner*—Jeffrey A. Gaffin
*Assistant Examiner*—Michael J. Sherry
*Attorney, Agent, or Firm*—Mason, Kolehmainen, Rathburn, & Wyss

[57] ABSTRACT

A method and apparatus are provided for protecting a non-isolated data communications cable against ground skew used with an AC power source. A current summing transformer is coupled to an AC power source. The current summing transformer includes a single transformer core and a plurality of coils. One of the coils is connected in series with each phase, neutral (if present) and ground line in the AC power source. The plurality of coils are substantially identical. Each coil has an identical number of turns and an identical direction of winding on the transformer core. The current summing transformer is only needed in the power path to one of two or more interconnected systems. The current summing transformer introduces a high impedance to surge current in the data cable ground of one or many non-isolated data cables attached to the system and at the same time offers substantially zero impedance to the normal power currents including leakage and fault ground currents.

10 Claims, 9 Drawing Sheets

GROUND SKEW PROTECTION METHOD AND APPARATUS

FIELD OF THE INVENTION

The present invention relates to a method and apparatus for protecting against ground skew, and more particularly to a method and apparatus for protecting a non-isolated data communications cable against ground skew.

DESCRIPTION OF THE PRIOR ART

The ground skew problem addressed by the present invention is a dynamic difference in ground potential that can exist between two interconnected electronic systems. While the steady state ground potential difference is limited by safety codes, the transient ground potential difference may be significantly larger in magnitude, often exceeding the magnitude of the data signal between the interconnected systems, and may be a source of data corruption.

Figure 1:
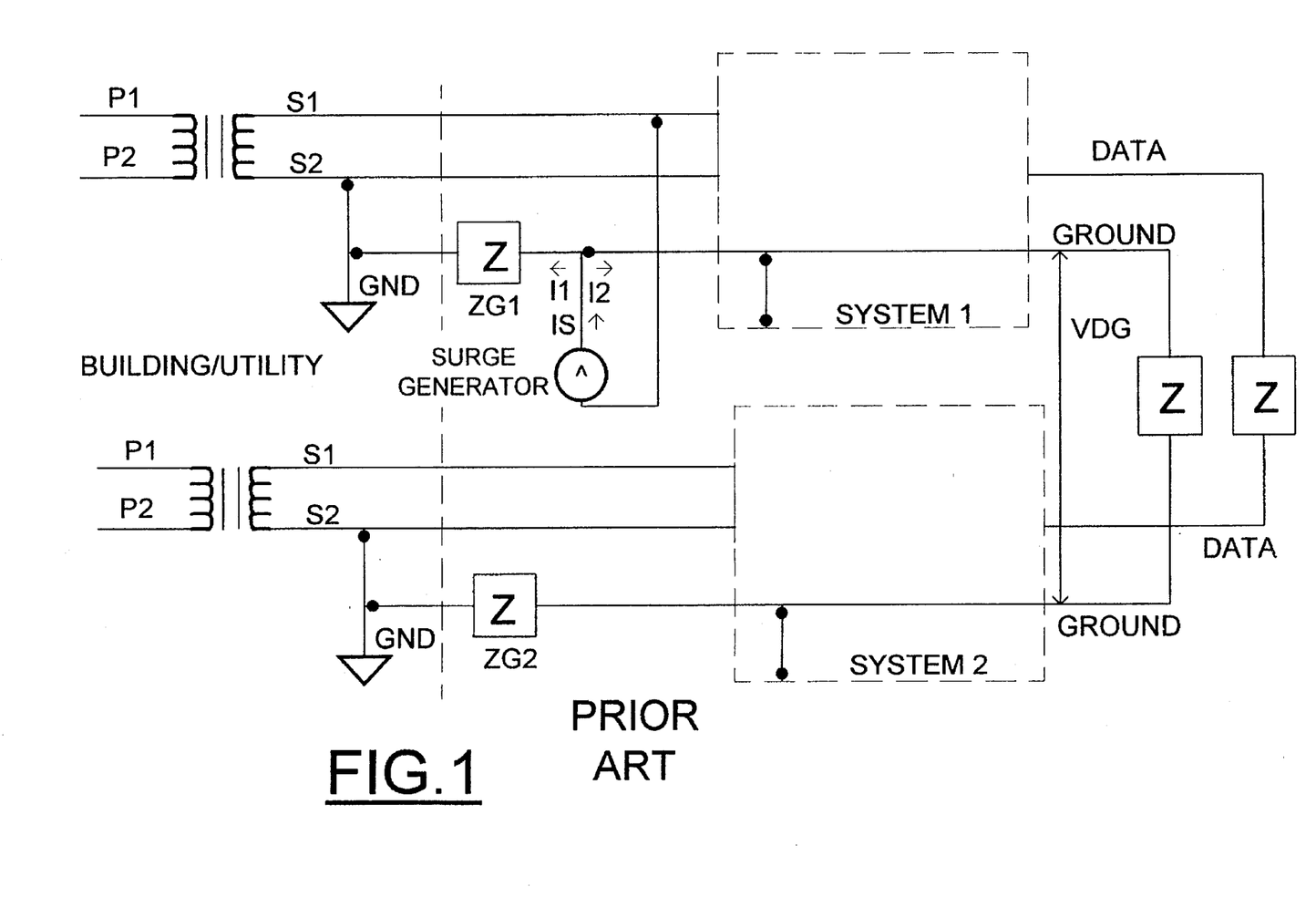
FIG. 1 is a schematic diagram representation of a prior art pair of interconnected systems that are ground referenced and are interconnected by a data communications cable and a ground cable without galvanic isolation.

The ground skew problem may be understood having reference to the prior art example shown in FIG. 1. This problem involves a pair of interconnected systems 1 and 2 that are ground referenced and are interconnected by a data communications system and ground cable that does not have galvanic isolation. When a surge external to the systems occurs, represented by the surge generator in FIG. 1, the phenomenon called ground skew results. The ground skew voltage is the instantaneous voltage difference between any two pieces of equipment, shown as VDG. This voltage is developed due to transient current flow that divides between the two ground paths according to their respective impedance Z and ZG1, represented by currents I1 and I2. The current I2 flows through the data cable ground causing the voltage VDG between the two ends of the cable. As shown in FIG. 1, the chassis of systems 1 and 2 are connected to ground. The ground skew voltage will occur with or without the use of surge protective devices, however surge protective devices may aggravate this phenomenon by causing larger currents to flow through the series impedance of the data ground wiring. Ground skew does not occur unless there is another ground connection (errant ground or ground loop), such as with a non-isolated data communications cable. This situation stresses the communications interface and can cause data errors and hardware failure.

One known solution to this type of problem is to isolate the data cable ground connection, for example, utilizing transformer and opto-isolation techniques. These isolation arrangements result in additional expense, especially when multiple data lines are involved. For this reason, an isolation arrangement is not always provided by the equipment manufacturer.

Another proposed approach is to place an impedance in the ground lead for system 1 or system 2 or both. This approach causes serious human safety concerns, even though it can solve the data integrity problem by reducing the magnitude of I2.

A need exists for an improved method and apparatus for protecting a non-isolated data communications cable against ground skew and that prevents the surge current from flowing down the data cable ground, and that avoids the disadvantages of the known arrangements.

SUMMARY OF THE INVENTION

A principal object of the present invention is to provide an improved method and apparatus for protecting a non-isolated data communications cable against ground skew. Other objects are to provide such improved method and apparatus substantially without negative effects, and that overcome many of the disadvantages of prior art arrangements.

In brief, a method and apparatus are provided for protecting a non-isolated data communications cable against ground skew used with an AC power source. A current summing transformer is coupled to an AC power source. The current summing transformer includes a single transformer core and a plurality of coils. One of the coils is connected in series with each phase, neutral (if present) and ground line in the AC power source. The plurality of coils are substantially identical. Each coil has an identical number of turns and an identical direction of winding on the transformer core.

The current summing transformer is only needed in the power path to one of two or more interconnected systems. The current summing transformer introduces a high impedance to surge current in the data cable ground of one or many non-isolated data cables attached to the system and at the same time offers substantially zero impedance to the normal power currents including leakage and fault ground currents.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 2:
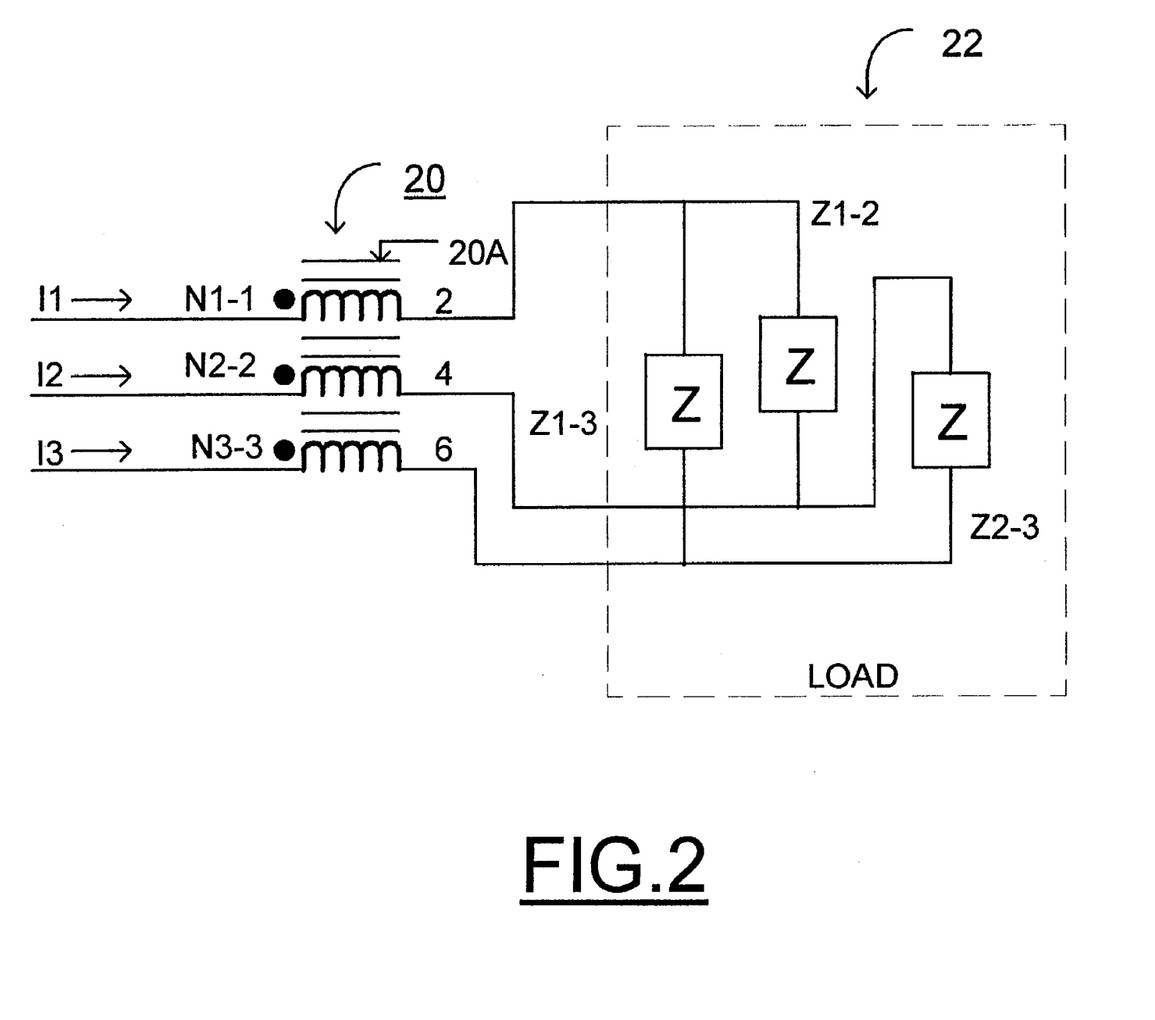
FIG. 2 is a schematic diagram representation of a single phase supply including a current summing transformer for ground skew protection in accordance with the present invention.

Having reference now to the drawings, in FIG. 2, there is shown a current summing transformer generally designated by 20 in accordance with the present invention. In FIGS. 2-8, identical numbers and the same numbers with prime notations are used for identical and similar components. Current summing transformer 20 includes a coil N1, N2, and N3 in each phase, neutral and ground line in the power path of a system generally designated by 22. System 22 includes a respective load impedance Z1-3, Z1-2, Z2-3 between the power lines. The current summing transformer 20 is used in series with the power path providing utility power to system 22, with identical windings N1, N2 and N3 in each of the power path leads or wires labeled I1, I2, I3 which includes the ground lead. In accordance with a feature of the invention, the current summing transformer 20 offers near zero impedance to the normal power currents including ground leakage and ground fault currents and preserves the local ground integrity for safety requirements.

In the current summing transformer 20, the relationship of the turns and the currents can be represented by:

$$I1N1+I2N2+I3N3=0$$

In the transformer 20, N1=N2=N3, where both the number of turns and direction are equal, then the following simplified equation is true:

$$I1+I2+I3=0$$

If a fault occurs in the attached load 22, for example, between power lines I2 and I3, the current summing transformer 20 provides effectively zero impedance to the normal power currents including ground leakage and ground fault currents. However, for an errant power fault path for the current to return to the source outside of the transformer 20, the current in the three power lines I1, I2 and I3 does not sum to zero, and the current summing transformer 20 provides high impedance. The above current summing relationship can be extended to any number of windings from 2 to "n", hence:

$$\sum_{x=2}^{x=n} IxNx = 0 \text{ and if } Nx=N, \text{ then } \sum_{x=2}^{x=n} Ix = 0$$

Then as long as there is no other path for the current to return to the source outside of the transformer 20, the following statements will always be true: First, the net ampere turns on a single transformer core 20A of the current summing transformer is zero. Second, the flux in the core 20A is zero. Third, the EMF across the windings N1, N2, N3 (or NL, NN, NG of FIG. 3) is zero. Forth, the effective impedance of the windings N1, N2, N3 or NL, NN, NG is zero.

If an alternative path or errant path exists outside of the transformer 20, such that the sum of the winding currents is not zero, then the transformer 20 appears as high impedance to the current in the errant path. This is true until the transformer core 20A goes into magnetic saturation when the volt second design limit is exceeded, then the impedance drops to a low value. Various arrangements can be provided for the current summing transformer 20, current summing transformer 20' of FIG. 7 and current summing transformer 20" of FIG. 8. For example, various types of transformer cores can be used for the transformer core 20A, such as, one of a toroid, a laminated core, a cut core and a molded core. For example, the identical windings N1, N2, N3 or NL, NN, NG can be formed by multiple insulated, substantially identical lines wound in an identical direction through the transformer core 20A. Also, the identical windings N1, N2, N3 or NL, NN, NG can be formed by an identical number of turns typically selected in a range, such as, between five turns and two hundred turns.

In this invention, the core saturation of the transformer 20 is chosen so that high impedance to transient surge currents is maintained. The core saturation insures low impedance to errant path power frequency fault currents.

Figure 3:
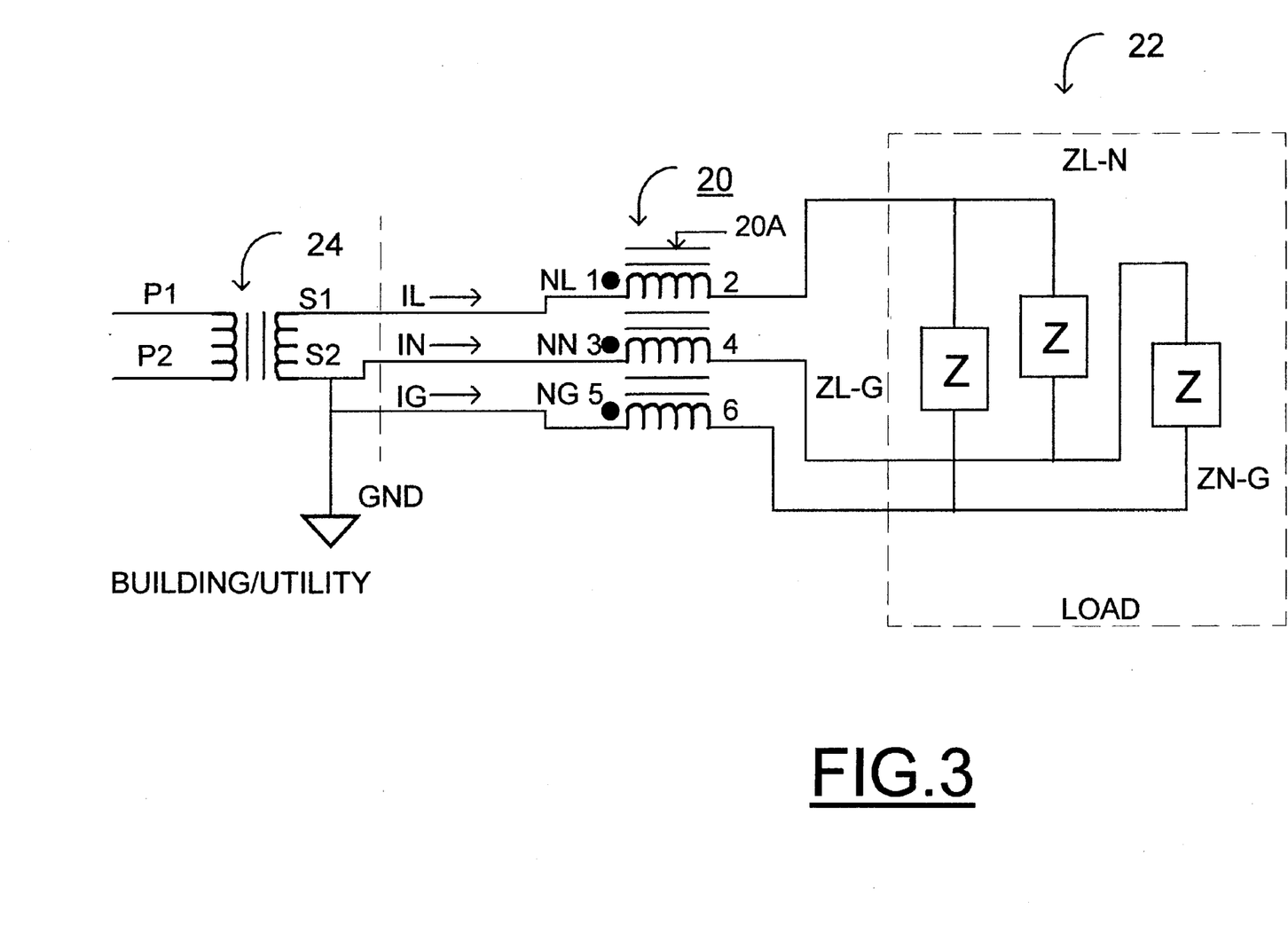
FIG. 3 is a schematic diagram representation similar to FIG. 2 further including an isolation transformer connecting an A-C utility supply and including a current summing transformer for ground skew protection in accordance with the present invention.

Referring also to FIG. 3, a single phase power supply is applied to live, neutral and ground power lines labeled IL, IN, IG via an isolation transformer 24. The primary of isolation transformer 24 labeled P1, P2 is connected to an AC utility power supply. The secondary of isolation transformer 24 labeled S1, S2 is connected to the current summing transformer 20.

FIG. 3 shows the application of a current summing transformer 20 in series with the three power leads of the single phase power supply connected to a system load 22. With the only ground reference to the load being the utility ground, via the current summing transformer winding NG, then with identical windings, NL, NN, and NG, where NL=NN=NG in both turns and direction of the winding on the transformer core 20A, and $$IL+IN+IG=0$$

This results in the current summing transformer 20 being essentially invisible to all the normal power line functions including those of safety. This is because no significant impedance is added to the live, neutral or ground path.

Figure 4:
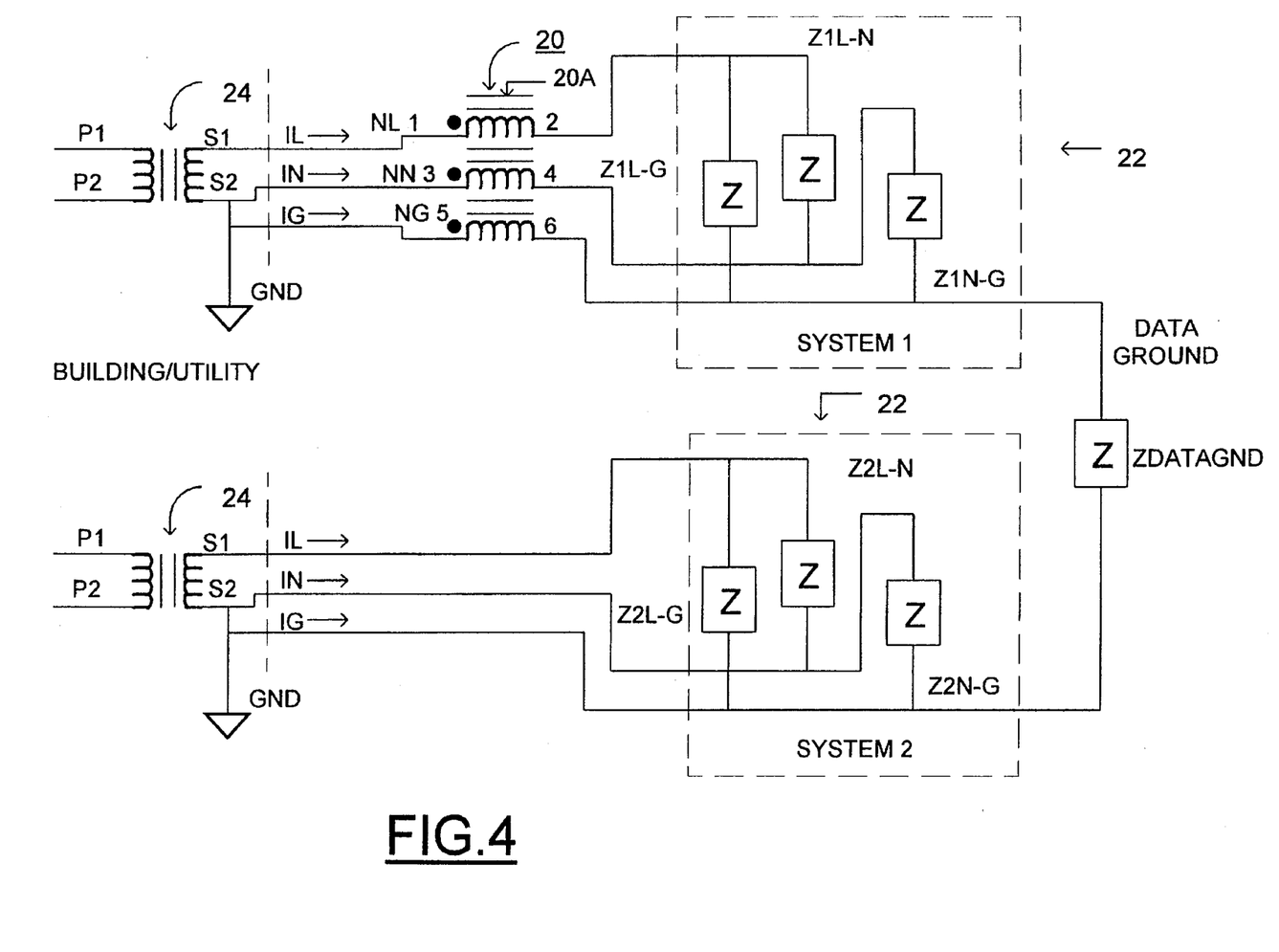
FIG. 4 is a schematic diagram representation of a pair of interconnected systems that are interconnected by a data communications ground cable including a current summing transformer for ground skew protection in accordance with the present invention.

Referring to the schematic in FIG. 4, a second system 22 also connected to the utility power via an isolation transformer 24 at some other location is linked to the first system 22 with a non-isolated data cable labeled DATA GROUND so that each system now has two paths to the utility ground. The data cable ground lead has an impedance ZDATAGND which will result in a voltage difference between the two ends of the data cable ground when current flows through it. This voltage difference can become part of the data signal and therefore must be minimized.

In FIG. 4, the second distant ground connection resulting from the interconnection to the second system such as a non-isolated data cable, results in an unbalance in the current summing transformer 20. Current summing transformer 20 provides a high impedance to any ground surge currents injected into the utility ground prior to the current summing transformer or at the distant end ground. The consequent reduction in ground surge current flowing through the data cable greatly reduces the voltage difference (or skew) between the two ends of the data cable ground and avoids corrupting the data or damaging the data hardware. This method of selectively introducing impedance into the ground lead only to ground current trying to return via a second ground path not derived through the current summing transformer 20, provides a unique and superior method of solving ground loop problems.

Figure 5:
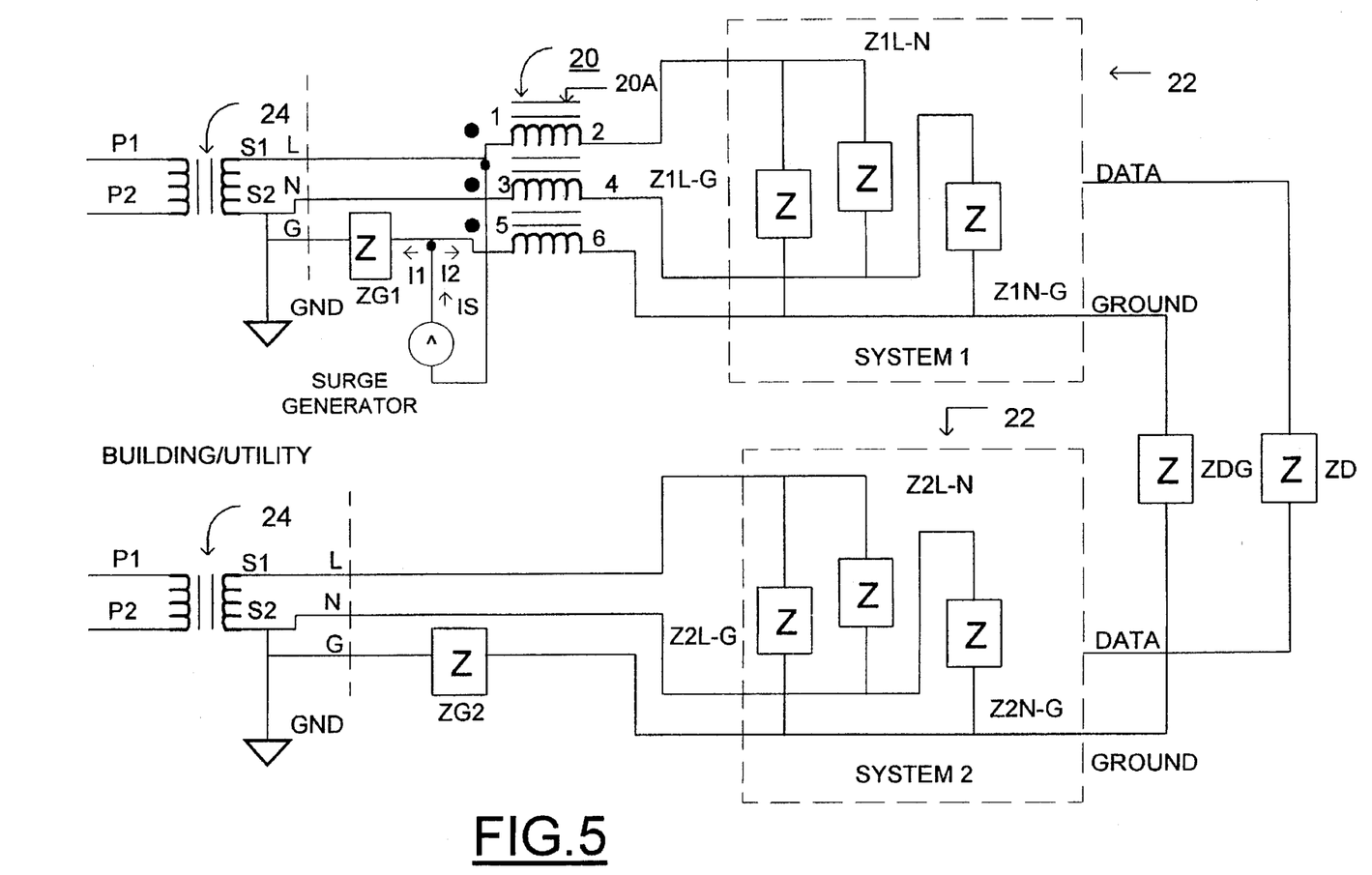
FIG. 5 is a schematic diagram representation similar to FIG. 4 further illustrating a surge generator and resulting current paths and including a current summing transformer for ground skew protection in accordance with the present invention.

Referring to FIG. 5, if a surge current to ground occurs on the utility side of the summing transformer 20, then the surge current tries to reach the building transformer ground bond via a path through ZG1(I1) and also via a second path through ZG2, the current summing transformer 20 and the data cable ground (I2). The current I2 passes through the ground winding NG on the current summing transformer 20, but it does not return via the other windings NL, NN on the current transformer. Under these conditions, the current transformer 20 offers a high impedance to the surge current, thus forcing it to mostly return via ground path ZG1 to the building ground. This minimizes the data line surge current and the voltage drop VDG.

Figure 6:
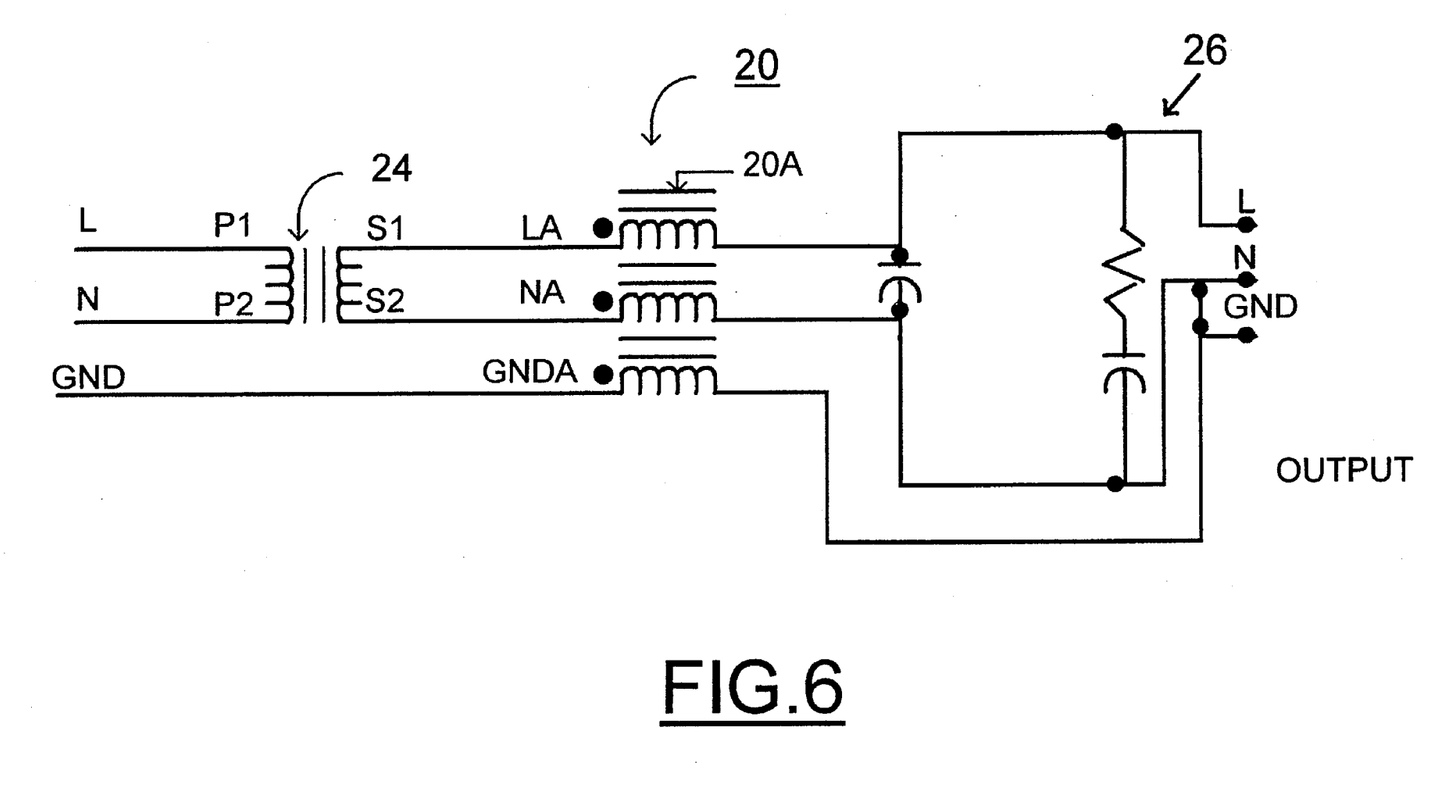
FIG. 6 is a schematic diagram representation similar to FIG. 3 including a resistor and capacitor filter protection circuit and including a current summing transformer for ground skew protection in accordance with the present invention.
Figure 6A:
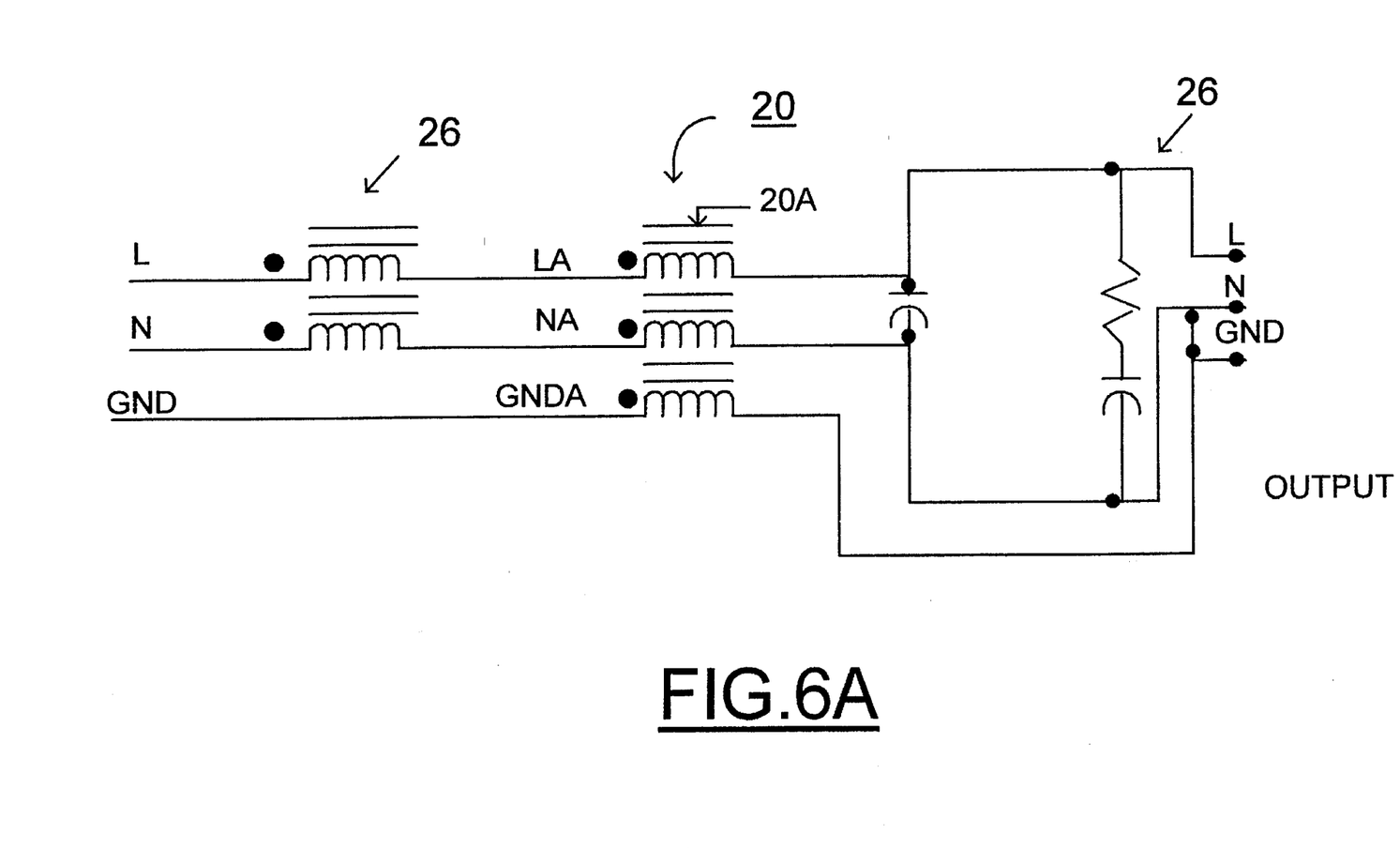
FIG. 6A is another schematic diagram representation similar to FIG. 3 including an inductor, resistor and capacitor filter protection circuit and including a current summing transformer for ground skew protection in accordance with the present invention.

Referring to FIGS. 6 and 6A, the current summing transformer 20 is shown together with the isolation transformer 24 and a conventional type of a protection filter 26. In FIG. 6A, the protection filter 26 includes a pair of inductors in the live and neutral power lines L and N, not shown in FIG. 6. The current summing transformer 20 can be used before or after the filter 26.

Figure 7:
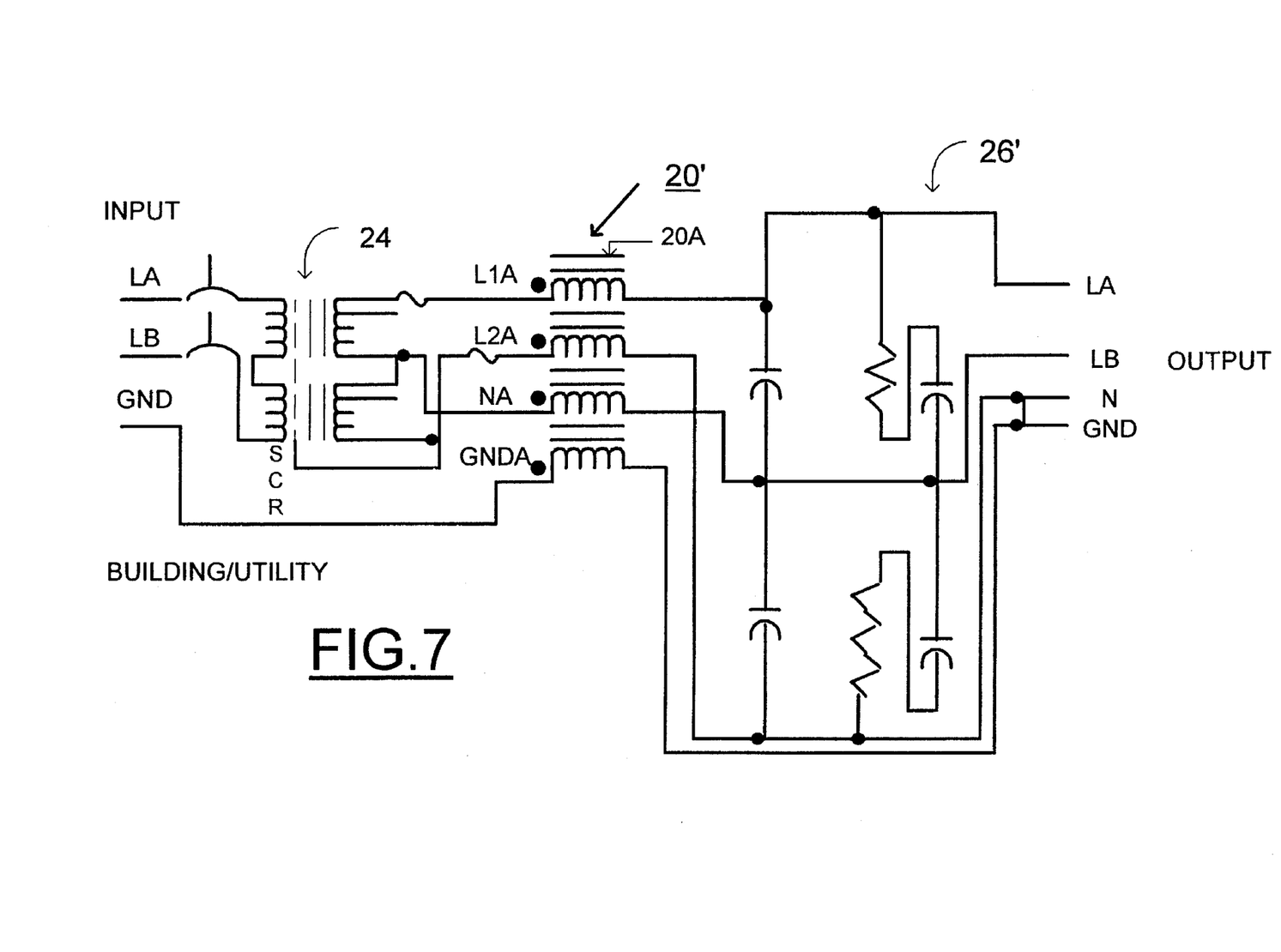
FIG. 7 is a schematic diagram representation similar to FIG. 6 with a split phase supply and including a current summing transformer for ground skew protection in accordance with the present invention.
Figure 8:
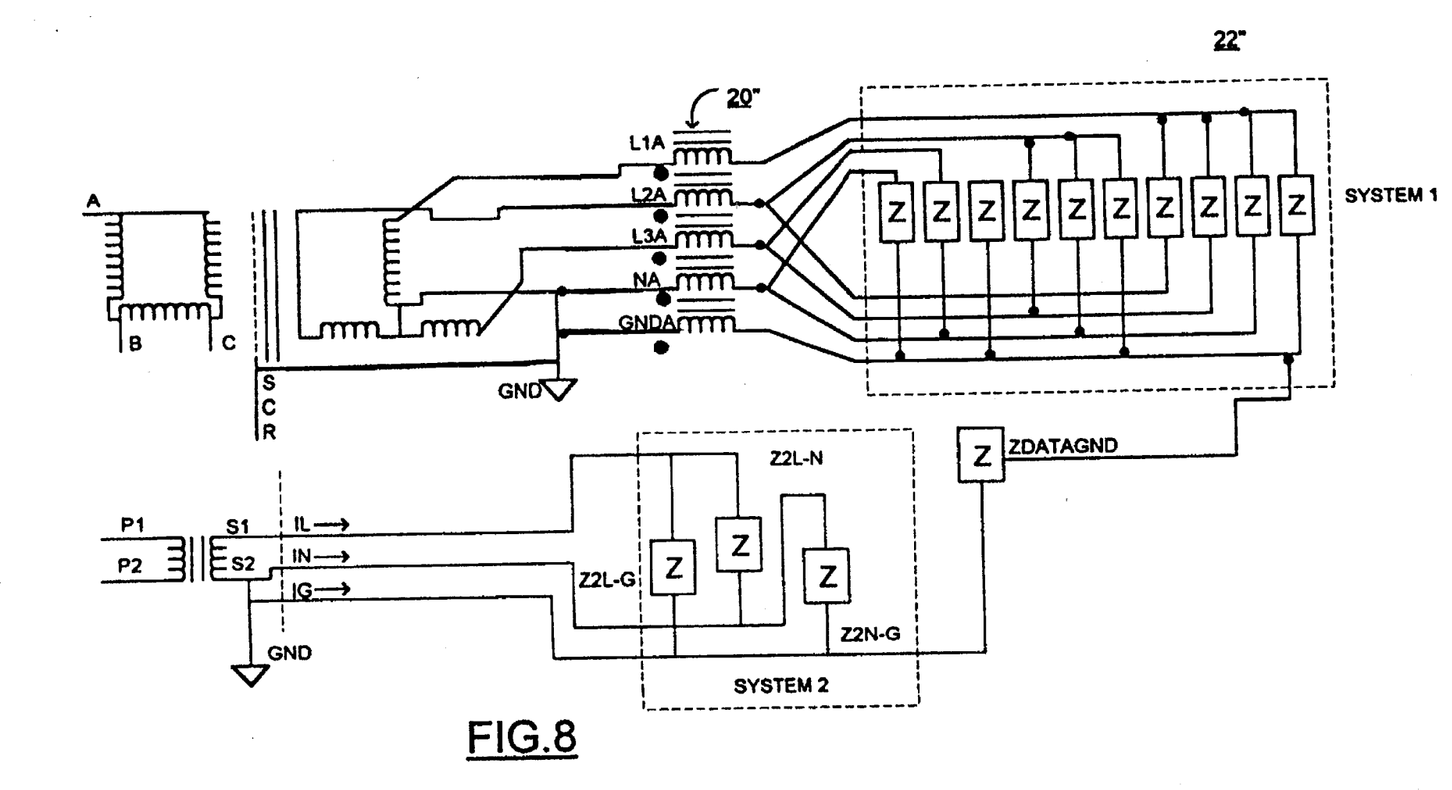
FIG. 8 is a schematic diagram representation similar to FIG. 7 with a multiple phase supply and including a current summing transformer for ground skew protection in accordance with the present invention.

The same teaching and principles described for single phase power can be applied to a split phase supply as shown in FIG. 7 including a current summing transformer 20' and for a multiple phase or three phase power as shown in FIG. 8 including a current summing transformer 20" provided that each power supply line including phase, neutral (when used) and ground each pass through a dedicated identical winding NL, NN, NG on a single core 20A of the current summing transformer 20, 20' and 20".

It should be understood that the current summing transformer 20, 20' and 20" can be provided in series with the power supply lines on either the supply side or load side of an isolation transformer 24. Also it should be understood that the current summing transformer 20, 20' and 20" can be provided in series with the power supply lines on either the supply side or load side of a filter 26, 26'. Also it should be understood that the current summing transformer 20, 20' and 20" can be without an isolation transformer 24 or a filter 26.

In brief summary, the current summing transformer 20, 20' and 20" of the invention reduces data and hardware problems due to errant energy sources by selectively raising the impedance of the current paths for only the errant energy, while keeping low impedance to all normal power source currents. The current summing transformer 20, 20' and 20" provides low impedance due to sustained errant power faults that exceed the volt-second saturation of the current summing transformer 20, 20' and 20" The current summing transformer 20, 20' and 20" can be applied to all networked and non-networked systems. The current summing transformer 20, 20' and 20" works with all power systems, single phase, split phase, three phase and more. The current summing transformer 20, 20' and 20" can be used safely with or without other power treatment devices and can be used with different technology power treatment devices. The current summing transformer 20" for a multiphase power system can be used on fewer phase applications. For example, a three phase current summing transformer 20" can be used on single phase applications, instead of current summing transformer 20.

While the present invention has been described with reference to the details of the embodiments of the invention shown in the drawing, these details are not intended to limit the scope of the invention as claimed in the appended claims.

What is claimed is:

1. An AC power source ground skew protection apparatus for protecting a non-isolated data communications cable against ground skew used with the AC power source comprising:

a current summing transformer coupled to the AC power source; said current summing transformer including;

a single transformer core; and a plurality of coils, one of said coils connected in series with each phase, neutral and ground line in the AC power source;

said plurality of coils being substantially identical; each coil having an identical number of turns and an identical direction of winding on the transformer core.

2. An AC power source ground skew protection apparatus for protecting a non-isolated data communications cable against ground skew as recited in claim 1 wherein each said coil has said identical number of turns in a range between five turns and two hundred turns.

3. An AC power source ground skew protection apparatus for protecting a non-isolated data communications cable against ground skew as recited in claim 1 wherein single transformer core is one of a toroid, a laminated core, a cut core and a molded core.

4. An AC power source ground skew protection apparatus for protecting a non-isolated data communications cable against ground skew as recited in claim 1 further includes an isolation transformer connected in series with said current summing transformer.

5. An AC power source ground skew protection apparatus for protecting a non-isolated data communications cable against ground skew as recited in claim 1 further includes an filter connected in series with said current summing transformer.

6. An AC power source ground skew protection apparatus for protecting a non-isolated data communications cable against ground skew as recited in claim 1 further includes an isolation transformer and a filter, both said isolation transformer and said filter connected in series with said current summing transformer.

7. An AC power source ground skew protection method for protecting a non-isolated data communications cable against ground skew used with the AC power source comprising the steps of:

providing a current summing transformer with a plurality of coils, one of said coils connected in series with each phase, neutral and ground line in the AC power source; said current summing transformer including a single transformer core; and said plurality of coils being substantially identical; each coil having an identical number of turns and an identical direction of winding on the transformer core;

providing, with said current summing transformer, high impedance to transient surge currents; and providing, with said current summing transformer, substantially zero impedance to normal power currents including ground leakage and ground fault currents, thereby preserving the local ground integrity for safety requirements.

8. A AC power source ground skew protection method as recited in claim 7 wherein said step of providing a current summing transformer with a plurality of coils, one of said coils connected in series with each phase, neutral and ground line in the AC power source; said current summing transformer including a single transformer core; and said plurality of coils being substantially identical; each coil having an identical number of turns and an identical direction of winding on the transformer core further includes the step of selecting said identical number of turns so that said single transformer core saturates at a predetermined voltage at power frequency.

9. A AC power source ground skew protection method as recited in claim 7 further includes the step of providing an isolation transformer connected in series with said current summing transformer.

10. A AC power source ground skew protection method as recited in claim 7 further includes the step of providing a filter connected in series with said current summing transformer.

* * * * *